United States Patent
Gal et al.

(10) Patent No.: US 11,050,706 B2
(45) Date of Patent: Jun. 29, 2021

(54) AUTOMATED AUTONOMOUS SYSTEM BASED DNS STEERING

(71) Applicant: salesforce.com, inc., San Francisco, CA (US)

(72) Inventors: Shauli Gal, Mountain View, CA (US); Satish Raghunath, Sunnyvale, CA (US); Kartikeya Chandrayana, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 304 days.

(21) Appl. No.: 15/466,664

(22) Filed: Mar. 22, 2017

(65) Prior Publication Data
US 2018/0278571 A1    Sep. 27, 2018

(51) Int. Cl.
*G06F 15/16* (2006.01)
*H04L 29/12* (2006.01)

(52) U.S. Cl.
CPC .................. *H04L 61/1511* (2013.01)

(58) Field of Classification Search
CPC .................................................. H04L 61/1511
See application file for complete search history.

(56) References Cited

U.S. PATENT DOCUMENTS

| | | | | |
|---|---|---|---|---|
| 2010/0228824 | A1* | 9/2010 | Lin | H04L 12/1818 709/204 |
| 2011/0032833 | A1* | 2/2011 | Zhang | H04L 45/70 370/252 |
| 2012/0066360 | A1* | 3/2012 | Ghosh | H04L 43/0864 709/223 |
| 2015/0319063 | A1* | 11/2015 | Zourzouvillys | H04L 41/5025 370/352 |
| 2015/0372969 | A1* | 12/2015 | Hopkins | H04L 67/1021 709/203 |
| 2016/0226708 | A1* | 8/2016 | Maheshwari | H04L 67/10 |
| 2018/0159924 | A1* | 6/2018 | Sun | H04L 43/0876 |

* cited by examiner

*Primary Examiner* — Kevin T Bates
*Assistant Examiner* — Clarence D McCray
(74) *Attorney, Agent, or Firm* — Wong & Rees LLP; Kirk D. Wong

(57) ABSTRACT

Network performance data, such as routing trip time between autonomous systems and data centers, is gathered and aggregated to determine optimal mappings of autonomous systems and data centers. Autonomous system based DNS steering may be automated by repeating a life cycle of determining the optimal mappings. Data delivery strategies are applied to a portion of a network to deliver content using the optimal mappings.

18 Claims, 5 Drawing Sheets

AUTOMATED AUTONOMOUS SYSTEM BASED DNS STEERING

The present invention relates generally to analysis of network performance data, and in particular, to domain name server (DNS) steering.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still has to weather the vagaries of the network, operating environment, and end device.

DNS plays an important role in the content delivery business: it tells every content consumer the optimal edge to approach in order to download content. Typically, network latency is thought to be related to geographic distance, such that the closer geographically two points are, the lower the expected network latency. However, due to various reasons, such as agreements between operators on how traffic is routed among their networks, business incentives, politics, and even human errors may lead to unexpected network latencies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
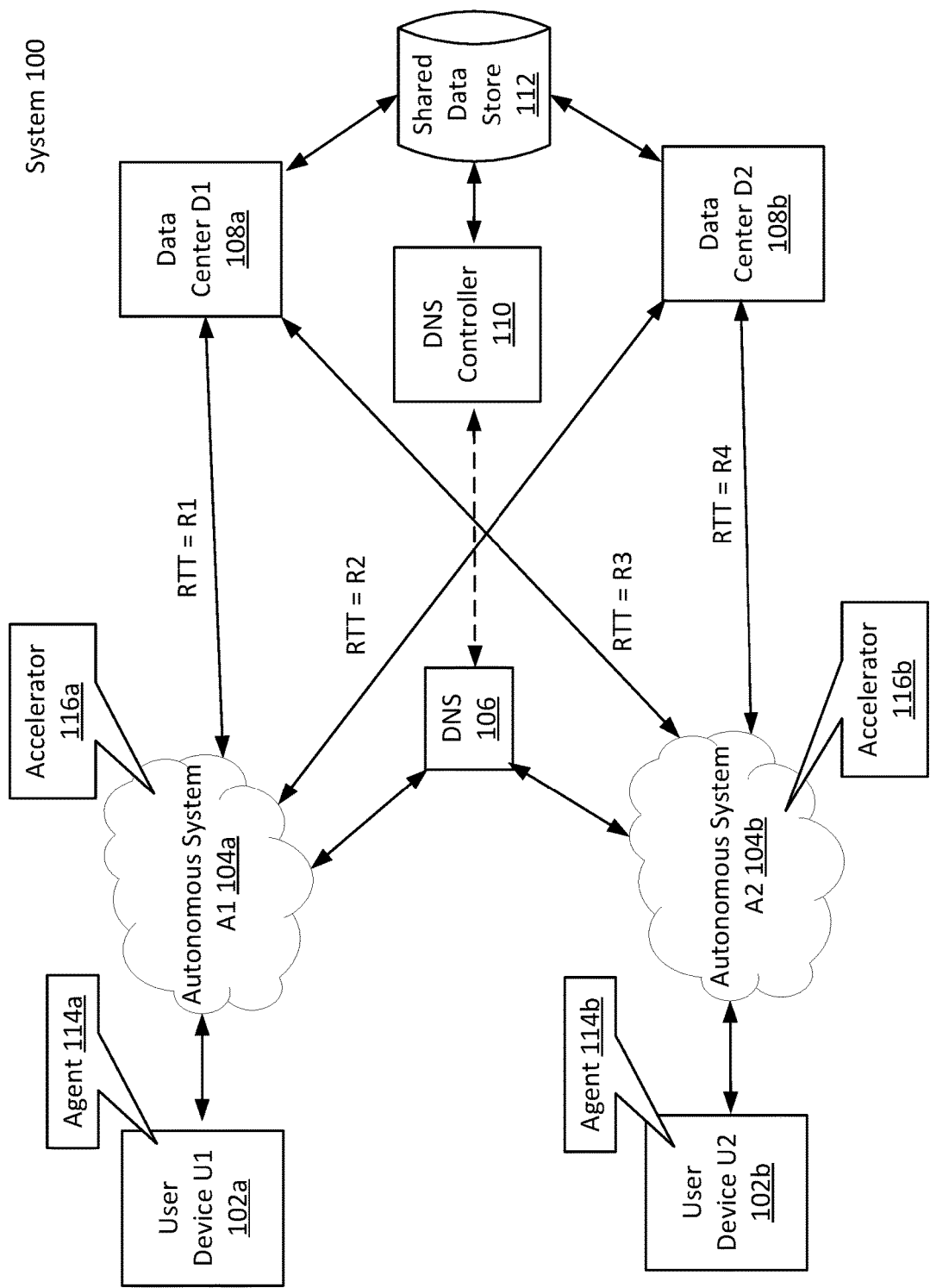
FIG. 1 illustrates a high-level block diagram, according to an embodiment of the invention.

Example embodiments, which relate to cognitive analysis of network performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEASURING LATENCY BETWEEN AUTONOMOUS SYSTEMS AND USER DEVICES
3. AUTOMATED DNS STEERING
4. AN EXAMPLE DATA STORE FORMULATION—THE EMPIRICAL PERFORMANCE STORE
5. IMPLEMENTATION MECHANISMS—HARDWARE OVERVIEW
6. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, and older technologies), WiFi (e.g., 802.11xx series of standards), satellite, and microwave. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.

b. The diversity in devices, operating system software and form factors results in a unique challenge from the perspective of user experience.

c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most of the network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to do the best at tasks such as data delivery. Within the Internet, an autonomous system (AS) is a collection of connected Internet Protocol (IP) routing prefixes under the control of one or more network operators on behalf of a single administrative entity or domain that presents a common, clearly defined routing policy to the Internet. DNS and other cloud servers may use the client's source IP to tell which administrative network the client is coming from. The Authoritative DNS server may allow the matching of clients coming from a specific AS to a specific DNS response. This DNS feature may be exposed via an application programming interface (API).

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Measuring Latency Between Autonomous Systems and User Devices

The performance of data delivery is closely tied to the operating conditions within which the end-device is operating. With ubiquitous wireless access over cellular and WiFi networks, there is a lot of volatility in operating conditions, so acceleration techniques must adapt to such a network by adapting to these conditions, e.g., the performance achievable over a private WiFi hotspot is very different from that with a cellular data connection. An accelerator 116, as illustrated in FIG. 1, dynamically adapts to these conditions and picks the best strategies based on the context.

The context captures the information about the operating conditions in which data transfer requests are being made. This includes, but not limited to, any combination of:

Type of device, e.g., iPhone, iPad, Blackberry, etc.
  This may also include the version of the device and manufacturer information.
  Device characteristics, e.g., the type of its modem, CPU/GPU, encryption hardware, battery, NFC (Near Field Communication) chipset, memory size and type or any other hardware information that impacts performance
  Mobility of device, e.g., whether the device is on a moving vehicle/train etc., or is stationary/semi-stationary.
  Operating System on the device.
  Operating System characteristics, e.g., buffering, timers, public and hidden operating system facilities (APIs), etc.
    This may also include operating system limitations such as number of simultaneous connections allowed to a single domain, etc.
  Usage information related to various device elements, e.g., Memory, Storage, CPU/GPU etc.
  Battery charge and mode of powering the device.
  Time of day.
  Location where available.
  IP Address and port numbers.
  Network type, e.g., WiFi or Cellular, or 3G/4G/LTE, etc., or Public/Home WiFi, etc.
    SSID (Service Set Identifier) in WiFi networks.
    802.11 network type for WiFi networks.
  Service Provider information, e.g., AT&T or Verizon for cellular, Time Warner or Comcast for WiFi, etc.
  Strength of signal from the access point (e.g., Wi-Fi hot spot, cellular tower, etc.) for both upstream and downstream direction.
  Cell-Tower or Hot-Spot identifier in any form.
  Number of sectors in the cell tower or hot spot.
  Spectrum allocated to each cell tower and/or sector.
  Any software or hardware limitation placed on the hot-spot/cell tower.
  Any information on the network elements in the path of traffic from device to the content server.
  Firewall Policy rules, if available.
  Any active measurements on the device, e.g., techniques that measure one-way delay between web-server and device, bandwidth, jitter, etc.
  Medium of request, e.g., native app, hybrid app, web-browser, etc.
    Other information describing the medium, e.g., web browser type (e.g., Safari, Chrome, Firefox etc.), application name, etc.
  Any other third party software that is installed on the device which impacts data delivery performance.
  Content Type, e.g., image, video, text, email, etc.
    Also includes the nature of content if it is dynamic or static.
  Content Location, e.g., coming from origin server or being served from a CDN (Content Delivery Network).
    In the case of a CDN, any optimization strategies being employed, if available.
  Recent device performance statistics, e.g., dropped packets, bytes transferred, connections initiated, persistent/on-going connections, active memory, hard disk space available, etc.
  Caching strategies if any, that are available or in use on the device or by the application requesting the content.
  In the case of content, where multiple objects have to be fetched to completely display the content, the order in which requests are placed and the order in which objects are delivered to the device. The request method for each of these objects is also of interest.

Based on the operating context, a cognitive engine may be able to recommend, but is not limited to, any combination of: end-device based data delivery strategies and accelerator-based data delivery strategies.

End-device based data delivery strategies refer to methods deployed by an application (an application could be natively running on the end-device operating system, or running in some form of a hybrid or embedded environment, e.g., within a browser, etc.) to request, receive or, transmit data over the network. These data delivery strategies include, but are not limited to, any combination of:

Methods used to query the location of service point, e.g., DNS, etc.

This may involve strategies that include, but are not limited to, any combination of: choosing the best DNS servers based on response times, DNS prefreshing, DNS refreshing/caching, etc.

Protocols available for data transport, e.g., UDP, TCP, SCTP, RDP, ROHC, etc.

Methods to request or send data as provided by the operating system, e.g., sockets, CFHTTP or NSURL-Connection in Apple's iOS, HttpUrlConnection in Google's Android, etc.

Session oriented protocols available for requests, e.g., HTTP, HTTPS, FTP, RTP, Telnet, etc.

Full duplex communication over data transport protocols, e.g., SPDY, Websockets, etc.

Caching and or storage support provided in the Operating System.

Compression, right sizing or other support in the devices to help reduce size of data communication.

Transaction priorities which outline the order in which network transactions to be completed:
  E.g., this may be a list of transactions where the priority scheme is simply a random ordering of objects to be downloaded.

Content specific data delivery mechanisms, e.g., HTTP Live Streaming, DASH, Multicast, etc.

Encryption support in the device:
  Also includes secure transport mechanisms, e.g., SSL, TLS, etc.

VPN (Virtual Private Network) of any kind where available and/or configured on the device.

Any tunneling protocol support available or in use on the device.

Ability to use or influence rules on the device which dictate how the data needs to be accessed or requested or delivered.
  This includes, but is not limited to, any combination of: firewall rules, policies configured to reduce data usage, etc.

Ability to pick the radio technology to use to get/send data. For example, if allowed, the ability to choose cellular network to get some data instead of using a public Wi-Fi network.

Ability to run data requests or process data in the background.

Threading, locking, and queuing support in the Operating System.

Ability to modify radio power if available.

Presence and/or availability of any error correction scheme in the device.

In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304395, entitled "Cognitive Data Delivery Optimizing System," filed Nov. 12, 2013, and which is hereby incorporated by reference in its entirety for all purposes. Embodiments are not tied down by assumptions on the current nature of the system. One aspect of data delivery that may be measured and stored in a database is latency per path, measured as a routing trip time (RTT) value.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only two user devices 102 (end-devices as described above) are shown in FIG. 1 in order to simplify and clarify the description.

As illustrated in FIG. 1, a system 100 includes two user devices 102 that are coming from two different operators, or autonomous systems 104, and two equivalent data centers 108 are shown to have different peering relationships with those operators. By default, the DNS server 106 advertises the addresses of both data centers 108, so the user devices 102 may be routed to each one of the data centers 108. The RTT values between the user devices 102 and the data centers 108 can be measured by the data centers 108 and logged to a shared database, or shared data store 112, in an embodiment. For example, an RTT value between autonomous system A1 104a and data center D1 108a may be measured to be a first real number value R1, while the RTT value between autonomous system A1 104a and data center D2 108b may be measured to be a second real number value R2. Similarly, an RTT value between autonomous system A2 104b and data center D1 108a may be measured to be a third real number value R3, while the RTT value between autonomous system A2 104b and data center D2 108b may be measured to be a fourth real number value R4.

Each database record in the shared data store 112 may include a domain name, AS number, data center name, timestamp, and measured RTT (latency per path). Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that provides inputs about the real-time operating conditions, participates and performs active network measurements, and executes recommended strategies. The agent 114 may be supplied in a software development kit (SDK) and is installed on the user device 102 when an application that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-toserver leg, etc. As mentioned above, in another embodiment, a data center 108 may log RTT values of user devices 102 in a shared data store 112.

An accelerator 116 sits in the path of the data traffic within an autonomous system 104 and executes recommended strategies in addition to gathering and measuring network related information in real-time. In one embodiment, an accelerator 116 may be a proxy host that is geographically distributed. Traditionally, geographic proximity of an autonomous system 104, and therefore an accelerator 116, had been used as a factor in optimizing DNS routing. However, according to some embodiments, techniques and methods described herein rely on RTT values measured over time to determine an optimal data center for each autonomous system 104, and as a result, redirecting the user device 102 to the associated accelerator 116.

A DNS controller 110 may aggregate information from both the accelerator 116 and the agent 114 and may also curate the information and processes it to continually evolve new strategies to achieve better outcomes in DNS steering, in an embodiment. In another embodiment, a DNS controller 110 may aggregate RTT values stored in the shared data store 112 to determine an expected RTT for each combination of AS 104 and data center 108.

Once a multitude of RTT values between user devices 102 and the data centers 108 are logged in the shared data store 112, it becomes possible to aggregate this data by AS and calculate an expected RTT for any combination of AS and data center. In an embodiment, a pre-determined time period elapses before aggregating the RTT values between user devices 102 and data centers 108. In another embodiment, a threshold number of RTT values may be captured before aggregating the RTT values to determine an expected RTT value between a particular combination of AS and data center.

3. Automated DNS Steering

Figure 2:
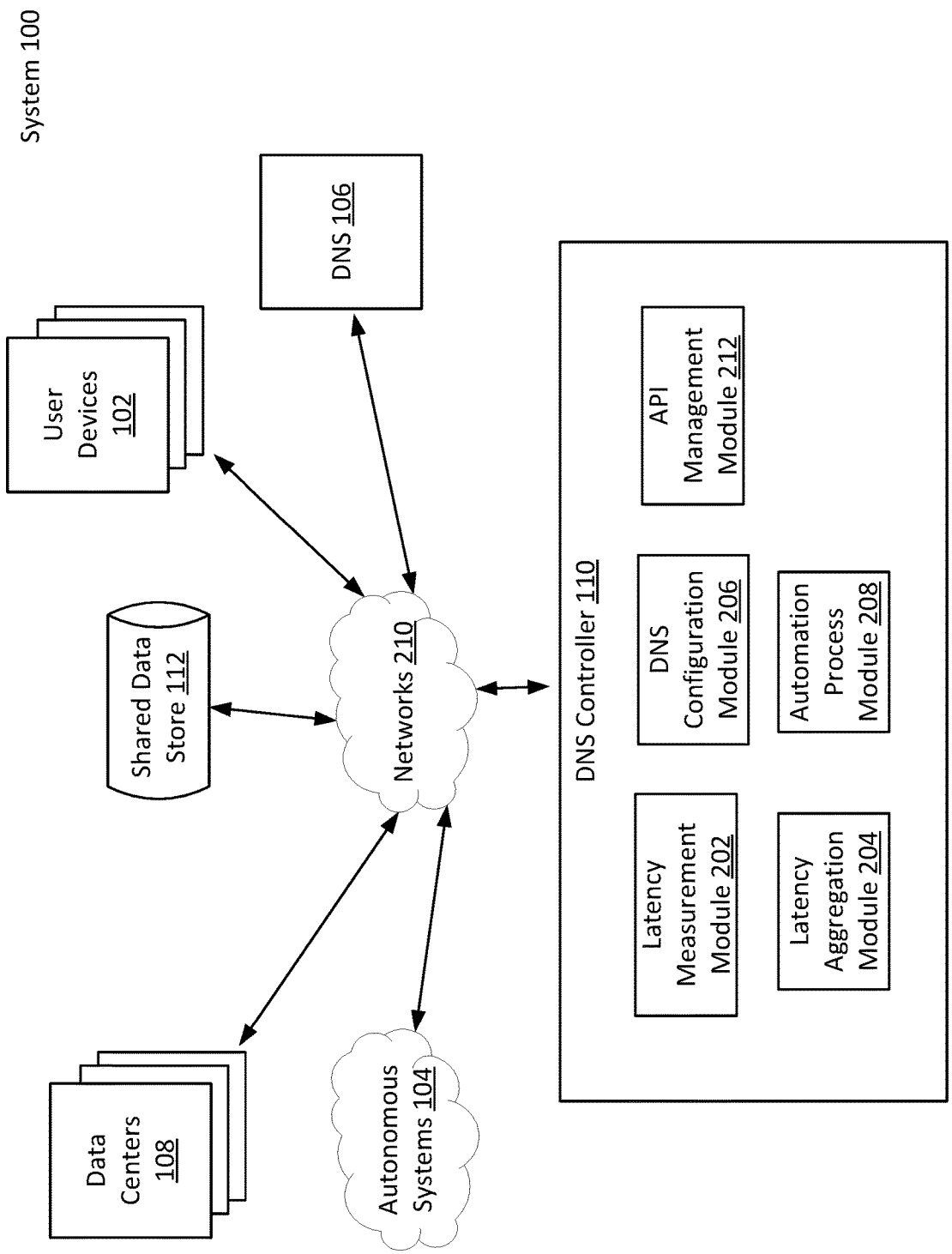
FIG. 2 illustrates a high-level block diagram, including an example DNS controller according to an embodiment of the invention.

FIG. 2 illustrates a high-level block diagram, including an example DNS controller, according to an embodiment. A DNS controller 110 may include a latency measurement module 202, a latency aggregation module 204, a DNS configuration module 206, an automation process module 208, and an API management module 212, in one embodiment. The DNS controller 110 may communicate data over one or more networks 210 with other elements of system 100, such as user devices 102, autonomous systems 104, one or more DNS servers 106, data centers 108, and one or more shared data stores 112.

A latency measurement module 202 may read, from a shared data store 112, one or more RTT values for combinations of autonomous systems 104 and data centers 108. In one embodiment, a latency, or RTT value, may be measured by an agent 114 of a user device 102. The latency measurement module 202 may capture the RTT value measured by the agent 114 through an API call, in an embodiment.

A latency aggregation module 204 may aggregate RTT values for a particular combination of autonomous system 104 and data center 108. An expected RTT value for the particular combination may be determined using the aggregation of RTT values. For example, an average of the measured RTT values between a particular combination of an AS and a data center may be used as the expected RTT value for that particular combination. In another example, a different aggregation of measured RTT values may be used instead of the average of measured RTT values, such as a percentile (e.g., $75^{th}$ percentile) or a range of percentiles of a distribution of the measured RTT values. An average may be too sensitive to outliers and administrators of the latency aggregation module 204 may select from different types of aggregations. Various types of aggregations may be used based on statistical methods.

A DNS configuration module 206 may be used to configure a DNS to perform various functions. For example, to capture enough RTT values between the various combinations of autonomous systems and data centers, the DNS configuration module 206 may configure the DNS to round-robin between all equivalent data centers, in an embodiment. The DNS configuration module 206 may set a time period, such as a number of days, for the DNS to be configured to round-robin between all equivalent data centers. In another embodiment, the DNS configuration module 206 may set a condition where the DNS is configured to round-robin between the equivalent data centers until a threshold number of RTT values is logged in the shared data store 112. The DNS configuration module 206 may also configure the DNS to route each AS to its optimal data center based on the expected RTT value using the aggregated RTT values. This configuration may be restricted to a subset of autonomous systems such that a majority of the traffic share is covered. This helps to contain the size of the configuration required.

An automation process module 208 may determine one or more parameters to enable automation of the DNS steering described above. Given the high number of AS numbers and data centers, as well as the possibility of network changes over time and the deterministic nature of identifying optimal matches of an AS to a data center based on aggregates of measured RTT values, the automation process module 208 of the DNS controller 110 may be used to identify a repeatable life cycle. The life cycle begins with configuring the DNS to round-robin between equivalent data centers. After a set number of days, or other time period, or after a threshold number of RTT measurements is captured in the shared data store 112, an aggregate RTT is calculated for every combination of AS and data center. The automation process module 208 may then select, for each AS, the data center with the lowest aggregate RTT value. The automation process module 208 may then configure the DNS, using an API, to route each AS to its optimal data center. After a second time period, the process may be started again by removing the AS filters in the DNS 106. The cyclical nature of the process mitigates the reality of changes in peering relationships. Because network conditions are constantly changing, new RTT data may be received from agents that causes the DNS controller 110 to change the API parameters. The automation process module 208 may be used for every domain name that the DNS controller 110 administers, in an embodiment.

An API management module 212 may manage one or more APIs used to control the DNS 106. For example, a particular DNS may be controlled using a particular API whereas a different DNS may be controlled with a different API. As new APIs become available, the API management module 212 may be updated to enable the DNS controller 110 to send instructions to the DNS 106.

4. An Example Data Store Formulation—the Empirical Performance Store

Figure 3:
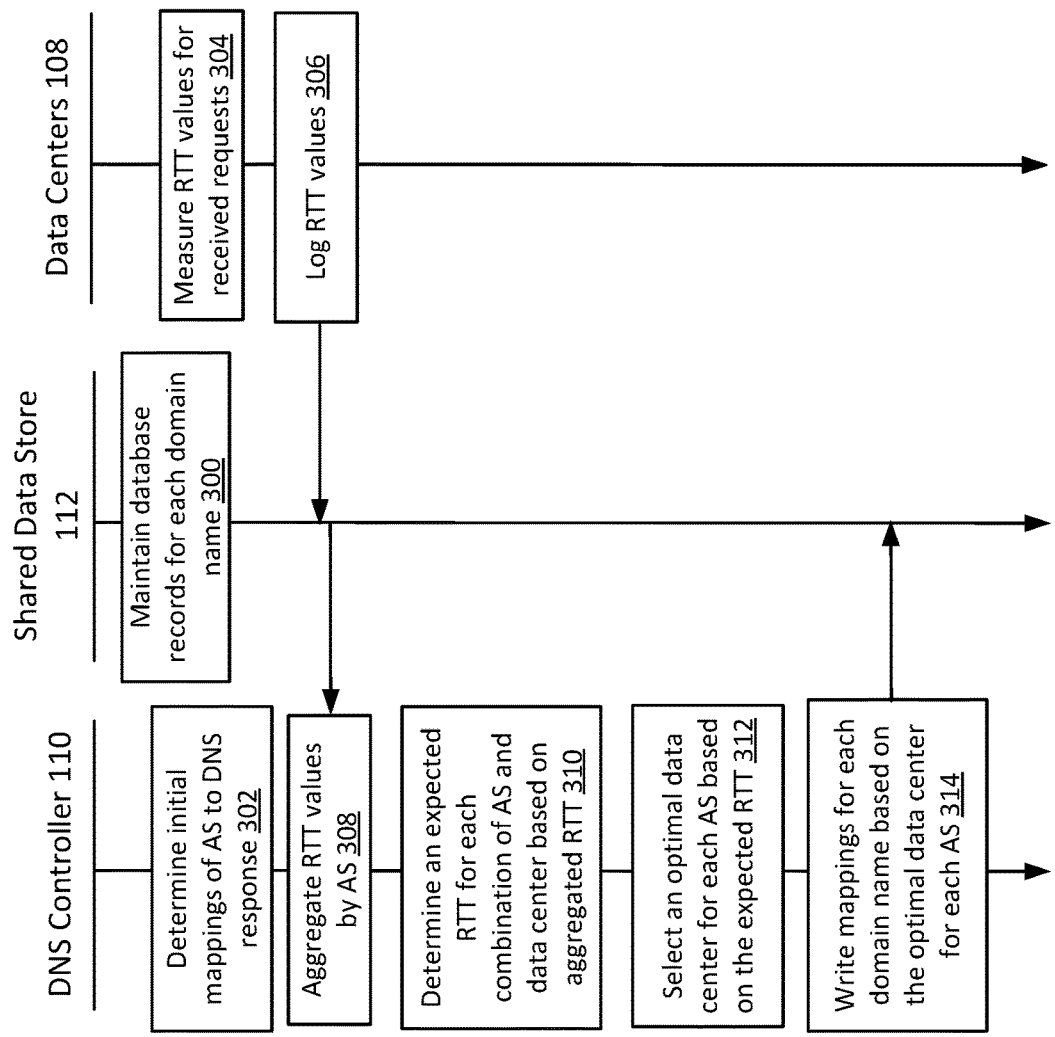
FIG. 3 illustrates a high-level interaction flow diagram of an autonomous system based DNS steering, according to an embodiment of the invention.

FIG. 3 illustrates a high-level interaction diagram of autonomous system based DNS steering, according to an embodiment. Database records are maintained 300 for each domain name in a shared data store 112. An initial mapping of autonomous systems to DNS response from data centers is determined 110 by a DNS controller 110. For received requests of content from user devices 102, RTT values are measured 304 by data centers 108. The RTT values are then logged 306 in the shared data store 112. After a condition is met, such as a period of time elapsing (e.g. a number of days, number of hours, number of minutes, etc.) or a threshold number of RTT values logged, the DNS controller 110 aggregates 308 the RTT values in the shared data store 112 by AS.

An expected RTT is determined 310 by the DNS controller 110 for each combination of AS and data center based on the aggregated RTT for the AS. An optimal data center is selected 312 for each AS based on the expected RTT. For example, the data center with the lowest expected RTT for each AS may be selected 312, in an embodiment. The mappings for each domain name are then written 314 by the DNS controller 110 to the shared data store 112 based on the optimal data center for each AS. As described above, the DNS controller 110 may repeat this process after a second period of time by removing the AS filters (e.g., removing the mappings).

In an embodiment, an operating context may be defined in terms of a fixed set of attributes of a mobile session such as the location, time-of-day, device type, and software platform on the device. For each such operating context, the impact of strategies on performance may be measured as the values of certain representative metrics such as round trip latency, throughput, loss rates, and jitter. Thus, the shared data store 112 may include bucketed operating context vectors along with measured results for performance strategies applied in those contexts.

Such a data store 112 may be queried to track the empirically measured performance for various operating contexts. The underlying assumption is a reasonable stationarity in metrics tracked. The data associated with each operating context has an expiry time after which it is discarded. New inputs for the same operating context are accumulated by way of aggregate statistics of each interesting metric.

An operating context is associated with results for specific performance strategies in order to facilitate self-learning. A DNS controller 110 may generate programmable logic to insert into a DNS server 106 via an API. The API may take into account the characteristics of the network as stored in the data store 112. An example may help illustrate a typical scenario that occurs. Interconnects between an origin (such as a data center) and an edge (such as a user device) cannot be controlled. Further, because of policies to balance network traffic as well as other reasons, operator traffic is also uncontrollable. This may lead to increased latency in data delivery, especially in emerging markets. For example, a user device in Pune, India, may make a data request. That data request may be routed, because of various policies, to a data center in Delhi, over 1500 km away, instead of a data center in Mumbai only 148 km away. Because an application may use an SDK that installs an agent onto the user device, the DNS may be programmed such that data requests coming from a specific operator (e.g., a Pune operator/AS identified by a specific AS number), the request is routed to the data center in Mumbai. This is an example if-then statement or rule that can be generated by the DNS controller 110 and sent to the DNS server 106 via an API. Because the rule is generated based on the data measured and captured by the SDK, it may be automated as described herein. An example if-then statement here may be "IF SOURCE NETWORK=X AND NAME=Y, then CONFIGURE DNS TO DATA CENTER Z ADDRESS. Example if-then statements, or rules, may be generated based on the RTT values measured and may be updated periodically. These rules may then be transformed into programmable logic that is sent to the DNS server 106 via an API. In this way, APIs are created that take into account the characteristics of the network. The DNS controller 110 may periodically update the rules based on recent network conditions, such as newly captured RTT values.

Figure 4:
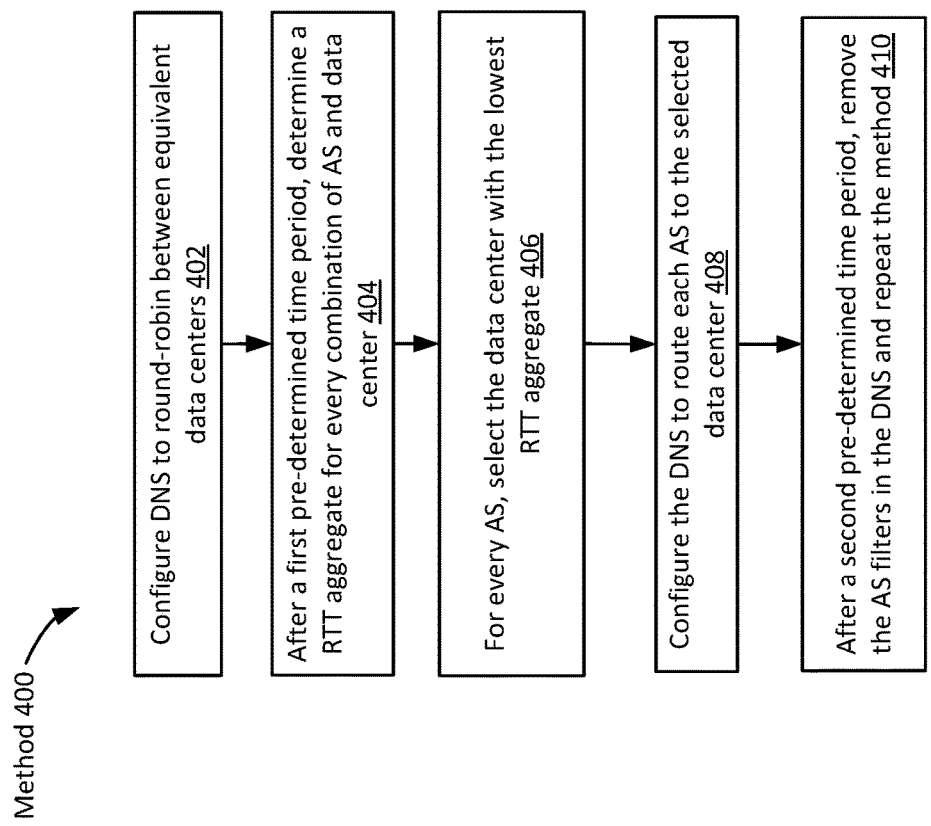
FIG. 4 illustrates a flowchart for an automated autonomous system based DNS steering, according to an embodiment of the invention.

FIG. 4 illustrates a flowchart for automated autonomous system based DNS steering, according to an embodiment of the invention. Method 400 may be used to automate the autonomous system based DNS steering, in an embodiment. The DNS may be configured 402 to round-robin between equivalent data centers. For example, the DNS may be configured to provide content to user devices requesting information from equivalent data centers in a round robin order, such that different RTT values are captured between the various combinations of autonomous systems and data centers. After a first pre-determined time period, such as X number of days, an aggregate RTT may be determined 404 for every combination of AS and data center. In one embodiment, the aggregate RTT may be an average of the logged RTT values in the shared data store 112. In another embodiment, the aggregate RTT may be a statistical computation of the set of logged RTT values. In other embodiments, various techniques may be used to calculate the RTT aggregate for every combination of AS and data center.

Next, the data center with the lowest RTT aggregate is selected 406 for every AS. The DNS controller 110 may then configure 408 the DNS to route each AS to its selected data center. This may be performed through an API call to the DNS from the DNS controller 110. After a second predetermined time period, such as Y number of days, the AS filters in the DNS may be removed 410 for the DNS controller 110 to repeat the method 400.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a lot of information about the network available in the transit traffic itself—from billions of devices consuming data. This information that describes network operating characteristics and defines efficacy of data delivery strategies is called a "network imprint". The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
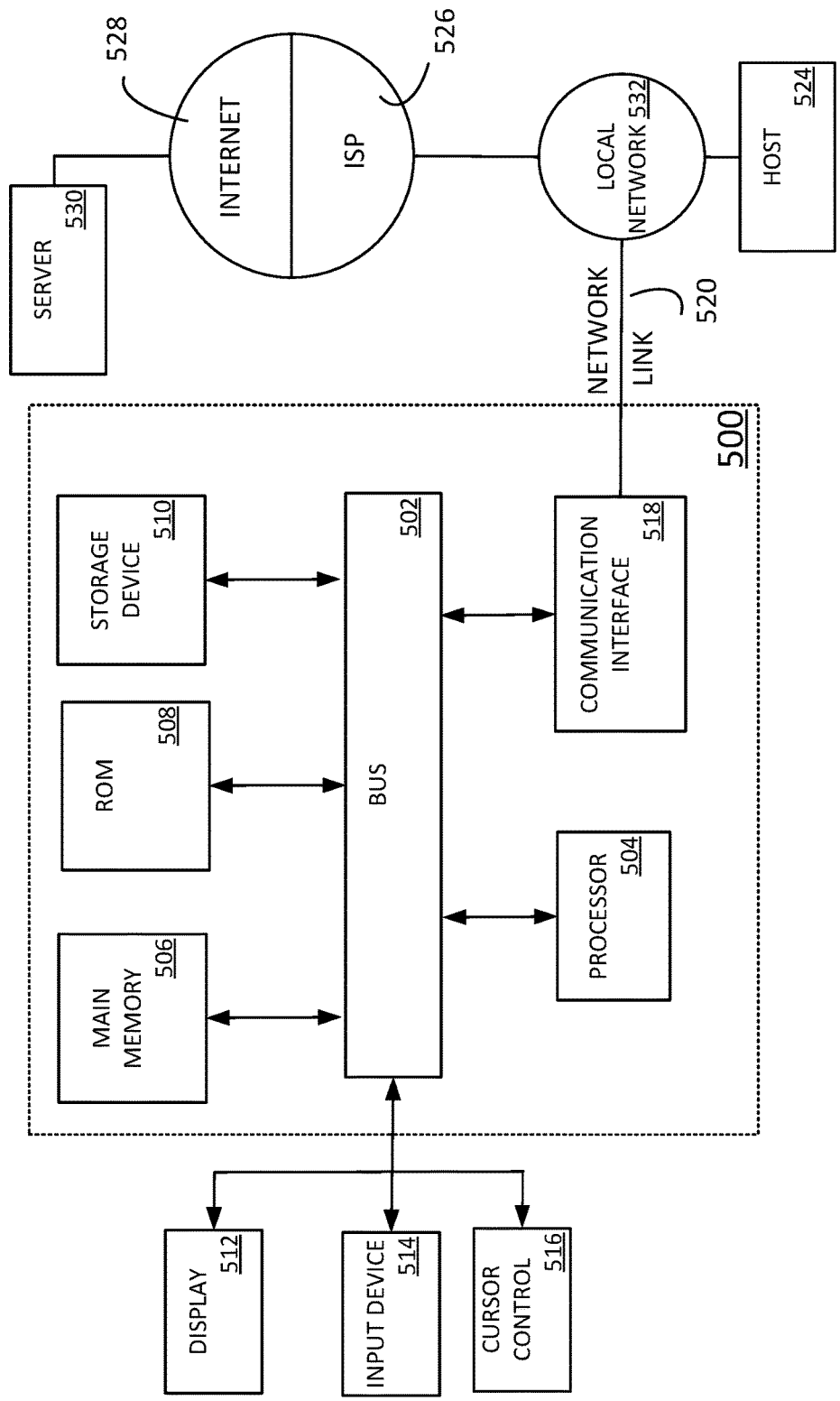
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, at a plurality of data centers, a plurality of data transfer requests from user devices via a plurality of autonomous systems, each autonomous system of the plurality of autonomous systems services a plurality of user devices;
   determining a plurality of routing trip time (RTT) values for data transfer requests associated with each autonomous system and one or more data centers in the plurality of data centers;
   storing the plurality of RTT values in a shared data store;
   for each autonomous system in the plurality of autonomous systems:
      determining an aggregate RTT value associated with each data center in the plurality of data centers based on a subset of the plurality of RTT values associated with the data center;
      selecting a data center having a lowest aggregate RTT value as an optimal data center for the autonomous system; and
      configuring a domain name server (DNS) to route data transfer requests from the autonomous system to the optimal data center using an autonomous system filter;
   periodically configuring the DNS to update the autonomous system filter to reflect recent network conditions.

2. The method as recited in claim 1, wherein each autonomous system comprises an accelerator to improve network performance.

3. The method as recited in claim 1, wherein each user device comprises an agent that logs RTT values associated with data transfer requests.

4. The method as recited in claim 1, wherein determining the plurality of RTT values is logged by each data center.

5. The method as recited in claim 1, wherein determining an aggregate RTT value associated with the data center comprises an average of the subset of the plurality of RTT values associated with the data center.

6. The method as recited in claim 1, wherein configuring the DNS is performed through an application programming interface (API) function call.

7. A non-transitory computer readable medium storing a program of instructions that is executable by a device to perform a method, the method comprising:
   receiving, at a plurality of data centers, a plurality of data transfer requests from user devices via a plurality of autonomous systems, each autonomous system of the plurality of autonomous systems services a plurality of user devices;
   determining a plurality of routing trip time (RTT) values for data transfer requests associated with each autonomous system and one or more data centers in the plurality of data centers;
   storing the plurality of RTT values in a shared data store;
   for each autonomous system in the plurality of autonomous systems:
      determining an aggregate RTT value associated with each data center in the plurality of data centers based on a subset of the plurality of RTT values associated with the data center;
      selecting a data center having a lowest aggregate RTT value as an optimal data center for the autonomous system; and
      configuring a domain name server (DNS) to route data transfer requests from the autonomous system to the optimal data center using an autonomous system filter;
   periodically configuring the DNS to update the autonomous system filter to reflect recent network conditions.

8. The non-transitory computer readable medium as recited in claim 7, wherein each autonomous system comprises an accelerator to improve network performance.

9. The non-transitory computer readable medium as recited in claim 7, wherein each user device comprises an agent that logs RTT values associated with data transfer requests.

10. The non-transitory computer readable medium as recited in claim 7, wherein determining the plurality of RTT values is logged by each data center.

11. The non-transitory computer readable medium as recited in claim 7, determining an aggregate RTT value associated with the data center comprises an average of the subset of the plurality of RTT values associated with the data center.

12. The non-transitory computer readable medium as recited in claim 7, wherein configuring the DNS is performed through an application programming interface (API) function call.

13. An apparatus, comprising:
   a subsystem, implemented at least partially in hardware, that receives at a plurality of data centers, a plurality of data transfer requests from user devices via a plurality of autonomous systems, each autonomous system of the plurality of autonomous systems services a plurality of user devices;
   a subsystem, implemented at least partially in hardware, that determines a plurality of routing trip time (RTT) values for data transfer requests associated with each autonomous system and one or more data centers in the plurality of data centers;
   a subsystem, implemented at least partially in hardware, that stores the plurality of RTT values in a shared data store;
   a subsystem, implemented at least partially in hardware, that for each autonomous system in the plurality of autonomous systems:
      determines an aggregate RTT value associated with each data center in the plurality of data centers based on a subset of the plurality of RTT values associated with the data center;
      selects a data center having a lowest aggregate RTT value as an optimal data center for the autonomous system; and configures a domain name server (DNS) to route data transfer requests from the autonomous system to the optimal data center using an autonomous system filter;

a subsystem, implemented at least partially in hardware, that periodically configures the DNS to update the autonomous system filter to reflect recent network conditions.

14. The apparatus as recited in claim 13, wherein each autonomous system comprises an accelerator to improve network performance.

15. The apparatus as recited in claim 13, wherein each user device comprises an agent that logs RTT values associated with data transfer requests.

16. The apparatus as recited in claim 13, wherein determining the plurality of RTT values is logged by each data center.

17. The apparatus as recited in claim 13, wherein determining an aggregate RTT value associated with the data center comprises an average of the subset of the plurality of RTT values associated with the data center.

18. The apparatus as recited in claim 13, wherein configuring the DNS is performed through an application programming interface (API) function call.

* * * * *